US012601431B2

(12) United States Patent
Beltrán París

(10) Patent No.:  US 12,601,431 B2
(45) Date of Patent:      Apr. 14, 2026

(54) BALL JOINT

(71) Applicant: ITP EXTERNALS, S.L.U., Derio (ES)

(72) Inventor: José Francisco Beltrán París, Derio (ES)

(73) Assignee: ITP EXTERNALS, S.L.U., Derio (ES)

( * ) Notice: Subject to any disclaimer, the term of this patent is extended or adjusted under 35 U.S.C. 154(b) by 0 days.

(21) Appl. No.: 18/409,851

(22) Filed: Jan. 11, 2024

(65) Prior Publication Data

US 2024/0263670 A1      Aug. 8, 2024

(30) Foreign Application Priority Data

Feb. 2, 2023    (EP) ..................................... 23382096

(51) Int. Cl.
F16L 27/04          (2006.01)
F02C 7/00           (2006.01)

(52) U.S. Cl.
CPC ................ F16L 27/04 (2013.01); F02C 7/00 (2013.01)

(58) Field of Classification Search
CPC .............................. F16C 11/0661; F16L 27/04
See application file for complete search history.

(56) References Cited

U.S. PATENT DOCUMENTS

| | | | |
|---|---|---|---|
| 5,611,577 A | 3/1997 | Meyer et al. | |
| 6,250,690 B1 * | 6/2001 | Sakai ...................... | F16L 27/04 285/302 |
| 7,631,408 B2 * | 12/2009 | Green .................... | B23P 15/00 29/897 |
| 9,683,687 B2 * | 6/2017 | Arigaya .............. | F16C 11/0676 |
| 2015/0338003 A1 | 11/2015 | Saito et al. | |

* cited by examiner

*Primary Examiner* — Courtney D Heinle
*Assistant Examiner* — John S Hunter, Jr.
(74) *Attorney, Agent, or Firm* — S.J. INTELLECTUAL PROPERTY LTD.

(57)          ABSTRACT

A ball joint connecting first and second tubular portions of a gas turbine engine duct assembly, accommodating angular variations between their longitudinal axes while resisting axial forces. The ball joint includes a housing with inner and outer shrouds that partially overlap to form an interface, and an internal bellows with limited flexure capability. The inner shroud extends from the first tubular portion and features a first thickening and spherical portion, while the outer shroud extends from the second tubular portion and includes a spherical portion and second thickening. During rest conditions, the overlapping interface between shrouds remains annularly constant, but under flexure stresses, this interface varies annularly while maintaining overlap. This design enables controlled angular movement within predetermined limits while providing structural integrity for gas turbine engine duct connections.

14 Claims, 5 Drawing Sheets

BALL JOINT

OBJECT OF THE INVENTION

The present invention relates to a ball joint for connecting together two tubular portions of a duct assembly in a gas turbine engine and allows angular movement between these two tubular portions. More particularly, the invention relates to an improved configuration of ball joint provided with local thickening that significantly improves the mechanical properties of the ball joint.

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine stages, also including multiple pairs of rotating blades and stationary vanes.

Duct assemblies are provided about the turbine engine and provide conduits for the flow of various operating fluids to and from the turbine engine. For example, one of the operating fluids in the turbine engine is bleed air. Current systems use ball joints or axial joints in the duct to meet requirements for flexibility, which compromise system dynamic performance by increasing the weight of the system.

In a typical aircraft mounted gas turbine engine, ball joints are used for joining together pressurized fluid carrying conduits which requires articulation there between. An integral bellows seal is provided inside the ball joints for preventing leakage of fluid flow there through while allowing articulation of the ball joint itself.

The current configuration of ball joints has a structure composed with components manufactured by forming whose materials are compatible with forming process. This has the disadvantage of limiting the materials that can be used and has an impact on bending moment due to the intrinsic tolerances of the forming processes. In addition, the current ball joint components have a quasi-constant thickness which leads to an increase in weight due to non-optimized thicknesses. Moreover, these known ball joints needs large thicknesses to support the loads and maintenance of the ball joint structure itself and also needs stress concentrators.

The present invention provides a ball joint with an improved configuration of local thickening that avoids, among other things, the above drawbacks that the current ball joints presents.

DESCRIPTION OF THE INVENTION

The present invention provides a ball joint according to claim 1 and a duct assembly according to claim 14. In dependent claims, preferred embodiments of the invention are defined.

A first aspect of the invention provides a ball joint for duct assembly of a gas turbine engine. Ball joints are used in fluid lines to impart limited flexibility for the purpose of accommodating tolerances, thermal expansion and vehicular motion. The present ball joint is intended for joining two tubular portions of a duct assembly of a gas turbine engine, however, this ball joint can be used in almost any type of fluid line. In particular, the present ball joint is configured for joining a first tubular portion with a second tubular portion, both tubular portions of the duct assembly. Each tubular portions of the duct assembly has a longitudinal axis.

The ball joint comprising:
- a housing configured to connect a first and second tubular portions of the duct assembly, the first and second tubular portions having respective longitudinal axis,
- a bellow arranged inside the housing and connected to the housing, the bellow being configured with limited flexure capability to accommodate variations in the angle between the longitudinal axes of the first and second tubular portions respectively; the housing being further configured to hold the tubular portions against axial forces while allows the flexure of the bellow within predetermined angle limits.

The present ball joint is provided to support the articulation between the two tubular portions of the duct assembly through the housing and the flexure capability of the bellow. The ball joint primarily allows the bellow to flex while holding the tubular portions of the duct assembly together, without axial deformation. Specifically, the housing prevents the axial movement of the two tubular portions. The tubular portions of the duct assembly rotate in solidarity with the respective shrouds of the housing to which they are attached. Therefore, when the tubular portions of the duct assembly are pressurized, the ball joint allows the bellow to flex within predetermined angle limits beyond which the ball joint would be broken in that the shrouds of the housing would be uncoupled and the bellow would stretch freely. That is, the flexure capability of the bellow is limited to accommodate variations in the angles which the longitudinal axes of the tubular portions form with respect to one another. The bellow serves to permit relative flexure within a limited angular range between the tubular portions of the duct assembly while maintaining the water tightness inside the duct. Thus, the present ball joint allows only turns with respect to the center of the sphere that conform the housing.

The housing holds the tubular portions of the duct assembly against axial forces due to the relative movement between these two tubular portions of the duct assembly. Moreover, the housing constrains the flexure of the bellow according to a predetermined angle limits, where these angle limits correspond to the maximum and minimum angles that the longitudinal axes of the tubular portions form with respect to one another.

The housing covers the bellow and the bellow is attached at its ends to the housing, in particular at the ends of the housing which are attached to each tubular portion respectively.

The housing comprising:
- an inner shroud extending from a first end to a second end, the first end being configured to be in contact with the first tubular portion of the duct assembly and the second end being located over the bellow, and
- an outer shroud extending from a first end to a second end, the first end being configured to be in contact with the second tubular portion of the duct assembly and the second end being arranged above the inner shroud, so that the outer shroud partially overlaps above the inner shroud, forming an overlapping interface between the inner shroud and the outer shroud.

The housing is formed by two shroud, an inner and outer shroud. These shroud are called one outer and the other inner as one of the shroud, the outer shroud, partially overlaps above the inner shroud. This overlapping provides an overlapping interface between the shrouds. It will be understood along this document the overlapping interface as the contact region between the surfaces of the inner shroud and outer shroud.

The inner shroud is configured to be attached to the first tubular portion of the duct assembly in a first end of the inner shroud, so that the inner shroud is cantilevered over the bellow, the second end of the inner shroud being arranged over the bellow. The outer shroud is configured to be attached to the second tubular portion of the duct assembly in a first end of the outer shroud and rest on the inner shroud so that a second end of the outer shroud being located above the inner shroud.

The inner shroud comprises a first thickening at a region located between the first end and the second end and a spherical portion extending between the second end and the first thickening; the outer shroud comprises a spherical portion arising from the second end and a second thickening at its second end.

The present ball joint is configured with the provision of two thickening arranged each in each shroud of the housing. Specifically, a first thickening arranged at a region of the inner shroud between the first end and the second end of the inner shroud; and a second thickening located in the second end of the outer shroud. Furthermore, both shrouds comprise a spherical portion extended at least in regions of each shroud between which the overlapping interface if provided due to the outer shroud partially overlaps the inner shroud. The two spherical portions of the shrouds are intended to be partially in contact with each other.

These two thickenings advantageously significantly improve the mechanical properties of ball joint so that the stress level of the ball joint is reduced while axial stiffness increases, and the deformation of the "spherical surface" provided by the inner and outer shrouds is reduced which impacts on the improvement of bending moment and load distribution of the ball joint.

Comparative test have been developed between a ball joint without the thickenings (prior art solutions) and a ball joint with the two thickening described above (according to this invention) to compare the stresses experienced by each ball joint under equal loads. From these tests, results have been obtained which indicate that the stress level goes from 1000 MPa to 180 MPa at equal loads from a ball joint without thickenings to a ball joint with the thickenings. The result has also been an increase in axial stiffness from KN/mm TO 100 KN/mm, as well as the deformation of the spherical surface of the housing is reduced by 50% improving the bending moment and load distribution.

In a rest position where the ball joint is not subjected to flexure stresses, the overlapping interface between the inner shroud and the outer shroud is annularly constant along the ball joint; and in at least one operating position where the ball joint is subjected to flexure stresses, the overlapping interface between the inner shroud and the outer shroud varies annularly along the ball joint while the outer shroud still overlaps over the inner shroud.

The present ball joint comprises at least two positions, a rest position and at least one operating position. The difference between these positions is whether the ball joint is subjected to flexure stresses or not, that is, the rest position is when the longitudinal axes of the first and second tubular portions are parallel or form an angle 0 to each other; and the operating position is when the longitudinal axes of the first and second tubular portions form an angle different from 0. As the angle formed by the two longitudinal axes of the tubular portions of the duct assembly can vary according to the relative movement between these tubular portions, the ball joint may comprise several operating positions, although for all of them there will always be an overlapping interface between the inner shroud and the outer shroud. Therefore, the rest position of the ball joint corresponds to the position in which the ball joint is not rotated while the operating positions correspond to the positions in which the ball joint is rotated compared to the rest position. Due to the pressurization of the ducts, the shrouds of the housing rotate relative to each other, which will be understood as the rotation of the ball joint being the one that allows the bellow to flex. The ball joint may rotate around two rotating axes, a first rotating axis through which the ball joint rotates allowing the bellow flexure and, a second rotation axis through which the ball joint rotates allowing the bellow torsion. Throughout this document, the rotation of the ball joint will be referred to as the rotation leading to the flexure of the bellow and not to the bellow torsion.

For the rest position of the ball joint, the term "annularly" will be understood relative to the longitudinal axes of the tubular portions; and for any of the operating positions of the ball joint, the term "annularly" will be understood relative to the longitudinal axis of any of the tubular portions, either with respect to the first or to the second longitudinal axis.

The fact that the overlapping interface varies annularly along the ball joint between the two shrouds of the housing means that the contact region between the surfaces of the shrouds may either increase or decrease along the ball joint when the ball joint is rotated (or subjected to flexure stresses). Thus, when the ball joint is subjected to flexure stresses, there will be sections where the overlapping interface remains constant, increases and/or decreases with respect to other sections or to the rest position.

The main object of this type of ball joint is to allow its rotation in a controlled manner without it suffering excessively, i.e. by reducing as far as possible the stress levels to which it is subjected. This is achieved in an improved way thank to the thickenings and their exact location. In the rest position of the ball joint, the two thickenings are located next to each other, which benefits the function of the present ball joint.

Advantageously, the new configuration of the present ball joint compared to prior art ball joints, provides a significant weight reduction at equal ball joint stress levels, increased axial stiffness, and reduction of the bending moment associated with the deflection of the spherical sliding surface of the outer shroud.

In an embodiment, the first thickening is a reinforcement ring extending annularly along the inner shroud, and the second thickening is a reinforcement ring extending annularly along the outer shroud at its second end. Both thickenings are reinforcement rings surrounding the entire ball joint from tis respective shroud. These thickenings provide a local reinforcement that advantageously reduces the deformation suffered by the inner and outer shroud by 50% due to the rotation of the ball joint.

In an embodiment, the first thickening is configured as a projection in an inner surface of the inner shroud so that the projection protrudes towards the bellow. The inner shroud comprises an inner surface faced to the inside of the ball joint or the bellow, and from this inner surface, between the first and second end of the inner shroud, a projection in the form of a reinforcement ring protrudes towards the inside of the ball joint or the bellow. This first thickening protrudes inwards into the ball joint.

In an embodiment, the second thickening is configured as a projection in an outer surface of the outer shroud so that the projection protrudes towards outside the ball joint. The outer shroud comprises an outer surface faced to the outside of the ball joint, and from this outer surface, at the second end of the outer shroud, a projection in the form of a reinforcement ring protrudes outwards the ball joint. This second thickening protrudes outwards the ball joint.

The first and second thickenings counteract the deformation suffered by the inner and outer shroud due to axial pressure loads so that the stiffness provided by the reinforcement ring means that both the inner and the outer shroud do not flex. That is, when the shrouds of the housing are under pressure, the provision of the thickening in both shrouds of the housing provide stiffness such that the housings do not decouple, i.e. there is no longer any overlapping surface between the shrouds of the housing. Therefore, the thickenings located in the housing increase the flexure stiffness both inwards and outwards in the housing.

These thickenings provided on the inner and outer shrouds respectively advantageously lightens the weight of the ball joint compared to the prior art solutions which use additional reinforcement elements (in some examples independent of the shrouds), which in turn makes their connection to other elements of the ball joint more difficult and more laborious to manufacture and assembly.

In an embodiment, the ball joint further comprises a first and second liners that extend cantilevered from the first ends of the inner and outer shroud respectively, wherein the below is supported at its ends on the first and second liners respectively. From each first end of the inner and outer shroud a liner is cantilevered extended and the bellow is attached at its end on these liners. That is, the bellow is supported by the liners and being in contact with the housing through said liners. Advantageously, the liners provides a correct support for the bellow.

In a more particular embodiment, each liner comprises an extension partially covering the bellow so that the bellow being housed between the housing and the extensions of the liners. These extensions from the liners are understood as aerodynamics fairing that shields the bellow from the air flow inside the duct assembly, mainly when fluid velocities exceed Mach 0.3.

In another embodiment, the bellow is directly attached to the housing so that he bellow being supported at its ends on the first ends of the inner and outer shroud respectively. As an alternative to the provision of liners on which the bellow is supported, the bellow may be attached to the housing in such a way that the bellow being supported at the first ends of the shrouds. Preferably, the bellow is attached to the inner and outer shroud by means of an appendix which is integral to the shrouds so that the bellow being attached to the underside of the appendix in order to facilitate the manufacturing process.

In an embodiment:
the inner shroud comprises a first ribbed pattern arranged annularly at an inner surface of the inner shroud, the first ribbed pattern corresponding to indentations on the inner surface of the inner shroud; and
the outer shroud comprises a second ribbed pattern arranged annularly at an outer surface of the outer shroud, the second ribbed pattern corresponding to projections on the outer surface of the outer shroud.

The provisions of these ribbed patterns both on the inner shroud and outer shroud advantageously reduces the weight of the ball joint which. These ribbed pattern are understood as reinforcement ribbed mesh on the shrouds, specifically, for the inner shroud the first ribbed pattern corresponds to indentations in the form of grooves on the inner surface of the inner shroud, and for the outer shroud the second ribbed pattern corresponds to projections that protrudes from the outer surface of the outer shrouds towards outside the ball joint. These ribbed patterns allows the shrouds of the housing to have sufficient thickness to provide rigidity to the ball joint as the ribbed patterns are intended to lighten the housing and in effect the ball joint.

In a more particular embodiment, the second ribbed pattern is arranged downstream of the second end of the outer shroud along a portion of the outer surface; and the first ribbed pattern is arranged between the first thickening and the second end of the inner shroud. Advantageously, the provision of the first and the second ribbed patterns reduce the weight of the ball joint while maintaining the stiffness of the shrouds.

In a more particular embodiment, the first and second ribbed pattern have an isogrid configuration. In another embodiments, the ribbed patterns have any configuration different from isogrid.

In an embodiment, both inner shroud and outer shroud are 3D printed structures. The reinforcements provided by the thickening in the ball joint take advantage of the capabilities of additive manufacturing o 3D printing to significantly improve the mechanical characteristic of the ball joint at minimal added cost. Advantageously, the 3D printing of these shrouds of the housing allows the inclusion of the thickening that clearly improve functionality in a cost-effective way. In addition, the use of the additive manufacturing allows the stiffness of the shrouds of the ball joint, specifically in their sliding areas, to be optimized. Moreover, additive manufacturing reduces the loss of materials in the manufacturing process as well as being less costly than other techniques used in the prior art, such as the machined manufacturing.

In an embodiment, the outer shroud is formed by two portions, the spherical portion and the remaining portion, and wherein these two portions are joined, preferably by welding. This specific configuration of the outer shroud is needed in order to accommodate the outer shroud partially around the inner shroud since the outer shroud cannot be deformed.

In a more particular embodiment, the two portions of the outer shroud are joined by high energy beam welding, preferably laser welding, and wherein the remaining portion comprises at its end where it is welded to the spherical portion a step on which a joining end of the spherical portion rests. Advantageously, the impact of the weld on the shroud is reduced, therefore the provisions of a step provides protection on the outer shroud when welding between portions, in addition the step prevents the beam or laser from going beyond the welding and impacting on the bellow inside the ball joint.

A second aspect of the invention provides a duct assembly of a gas turbine engine comprising a first duct with a first tubular portion, a second duct with a second tubular portion and at least one ball joint according to the first inventive aspect, wherein the first tubular portion of the first duct is connected to the first end of the inner shroud of the at least one ball joint and the second tubular portion of the second duct is connected to the first end of the outer shroud of the at least one ball joint.

DESCRIPTION OF THE DRAWINGS

These and other features and advantages of the invention will be more clearly understood based on the following detailed description of a preferred embodiment given only by way of illustrative and non-limiting example in reference to the attached drawings.

DETAILED DESCRIPTION OF THE INVENTION

The following describes examples of an improved ball joint in accordance with the present invention.

Figure 1:
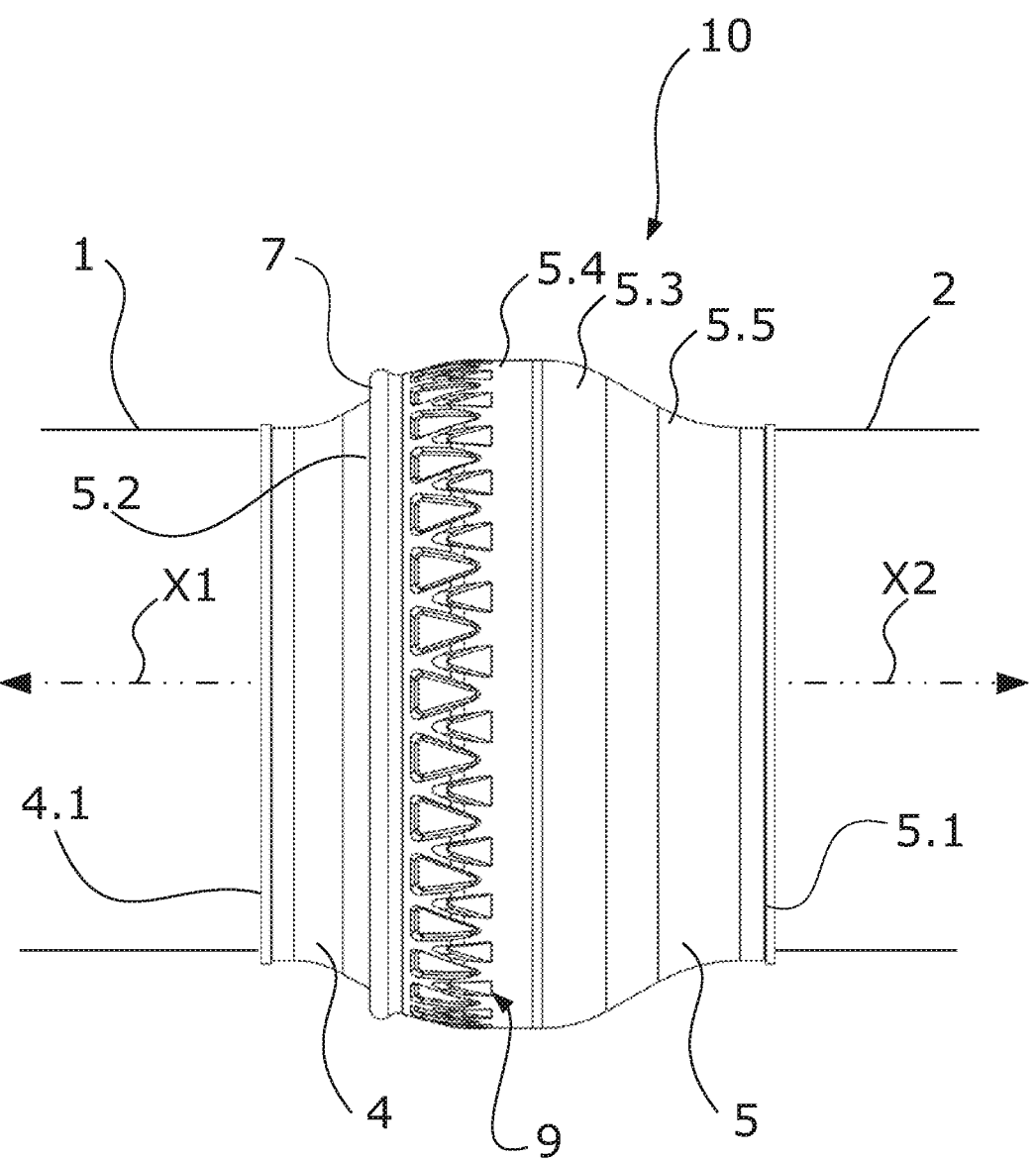
FIG. 1 shows a schematic frontal view of a duct assembly comprising a ball joint according to an embodiment of the present invention.

FIG. 1 shows a duct assembly of a gas turbine engine comprising a ball joint (10). The duct assembly comprises a first duct and a second duct both being connected to each other through the ball joint (10). In particular, the ball joint (10) is arranged between a first tubular portion (1) of the first duct and a second tubular portion (2) of the second duct of the duct assembly, so that the ball joint (10) is attached to these tubular portions 35 (1, 2) at their ends. The first tubular portion has a first longitudinal axis (X1) and the second tubular portion has a second longitudinal axis (X2).

This ball joint (10) shown in FIG. 1 comprises a housing that connects the two tubular portions (1, 2) of the duct assembly. This housing comprises an inner shroud (4) with a 5 first end (4.1) that is in contact with the first tubular portion (1) and an outer shroud (5) with a first end (5.1) in contact with the second tubular portion (2).

Figure 2:
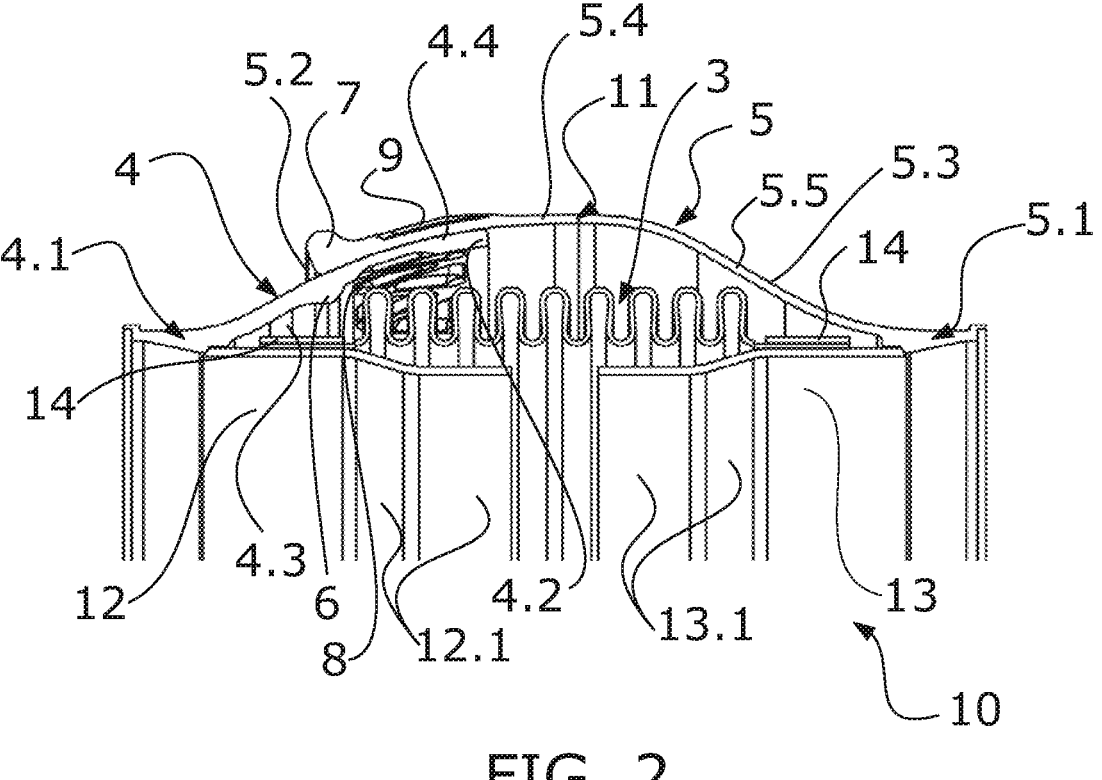
FIG. 2 shows a schematic cross sectional view of a ball joint according to an embodiment of the present invention.
Figure 3:
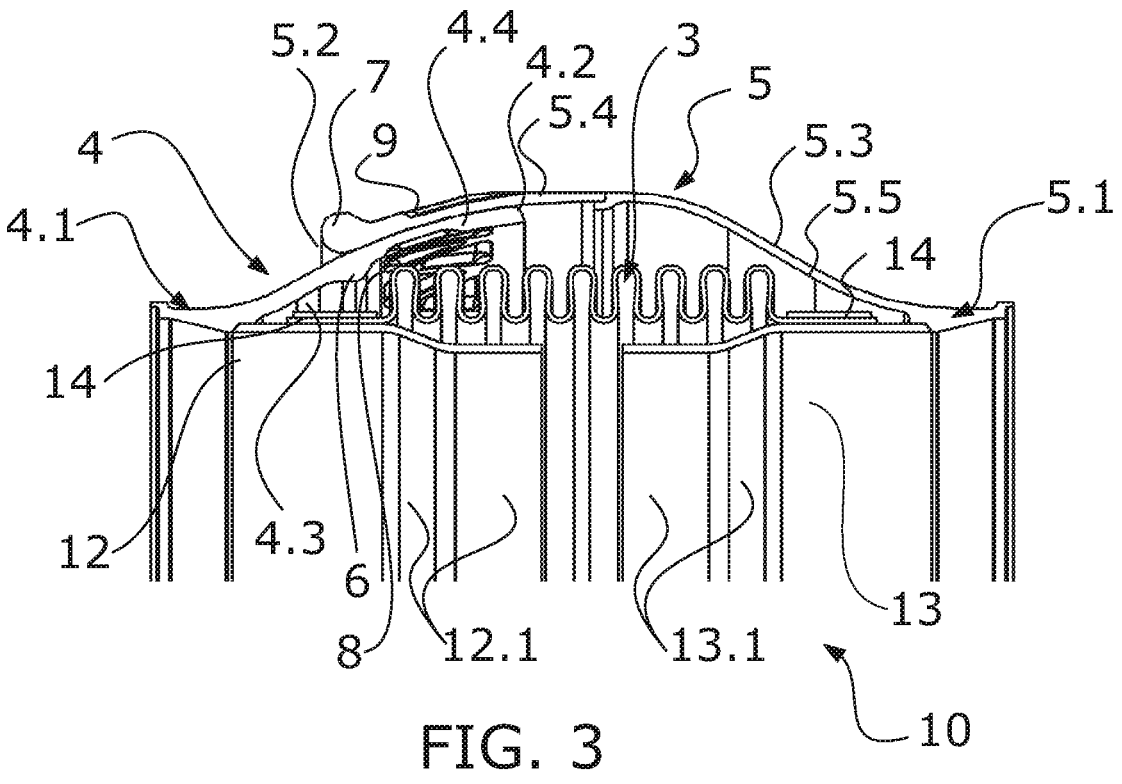
FIG. 3 shows a schematic cross sectional view of a ball joint according to another embodiment of the present invention.

The ball joint (10) further comprises a bellow (3) as it can be shown on FIGS. 2 and 3. These FIGS. 2 and 3 show a cross sectional view of a portion of the ball joint (10) shown in FIG. 1. The bellow (3) is housed in the housing and is configured with limited flexure capability to accommodate variations in the angle between the longitudinal axes (X1, X2) of the first (1) and second (2) tubular portions of the duct assembly respectively. The housing is configured to hold the tubular portions (1, 2) against axial forces while allows the bellow (3) to flex within predetermined angle limits set by the ball joint (10).

The inner shroud (4) of the housing further comprises a second end (4.2) arranged over the bellow (3). The outer shroud (5) of the housing further comprises a second end (5.2) arranged above the inner shroud (4), specifically, the outer shroud (5) partially overlaps above the inner shroud (4). In this sense, an overlapping interface is provided between the inner shroud (4) and the outer shroud (5), the overlapping interface being understood as the contact surfaces between the shrouds (4, 5) as a result of the outer shroud (5) overlapping above the inner shroud (4). The inner shroud (4) also comprises an inner surface (4.3) faced to the bellow (3), and the outer shroud (5) comprises an outer surface (5.3) faced to the outside of the ball joint (10).

Moreover, the inner shroud (4) comprises a first thickening (6) located at a region between the first end (4.1) and the second end (4.2) of the inner shroud (4). On the other hand, the outer shroud (5) comprises a second thickening (7) located at the second end (5.2) of the outer shroud (5). In addition, the inner shrouds (4) comprises a spherical portion (4.4) extended between the first end (4.1) and the second end (4.2) of the inner shroud (4). The outer shroud (5) comprises a spherical portion (5.4) extended from the second end (5.2) of the outer shroud (5) to a point midway between the first (5.1) and second (5.2) end. These spherical portions (4.4, 5.4) are coincident in the sense that at least a portion of them are partially in contact with each other, as it can be observed in FIGS. 2 and 3.

According to these FIGS. 1-3, the first thickening (6) of the inner shroud (4) is a reinforcement ring that is annularly extended along the inner shroud (4) relative to the first longitudinal axis (X1), and the second thickening (7) of the outer shroud (5) is also a reinforcement ring that in this case is annularly extended along the outer shroud (5) relative to the second longitudinal axis (X2). As it can be observed in FIGS. 2 and 3, the first thickening (6) is a projection that protrudes from the inner surface (4.3) of the inner shrouds (4) towards the inside of the ball joint (10) or the bellow (3). By contrast, the second thickening (7) is a projection that protrudes from the outer surface (5.3) of the outer shroud (5) towards the outside of the ball joint (10).

The ball joint (10) shown in these FIGS. 1-3 further comprises a first liner (12) and a second liner (13). The first liner (12) is extended cantilevered from the first end (4.1) of the inner shroud (4) as a bracket on which the bellow (3) is supported at one end, and the second liner (13) is extended cantilevered from the first end (5.1) of the outer shroud (5) as a bracket on which the bellow (3) is supported at the other end. Thus, the bellow is connected to the housing through these liners (12, 13) since it is attached to the liners (12, 13). Specifically, the bellow (3) is attached to the liners (12, 13) by fixing means (14).

These liners (12, 13) comprises an extension (12.1, 13.1) that partially covers the bellow (3) so that the bellow (3) is housed in a space bounded by the housing of the ball joint (10) and the liners (12, 13) with their respective extensions (12.1, 13.1).

In another example (shown in FIG. 3), the bellow (3) is directly attached at one end to the first end (4.1) of the inner shroud (4) and at the other end to the first end (5.1) of the outer shroud (5). According to this example, the bellow (3) is connected to the housing through its direct link to the housing, the bellow (3) being supported by the first ends (4.1, 5.1) of the shrouds (4, 5) respectively.

Figure 3A:
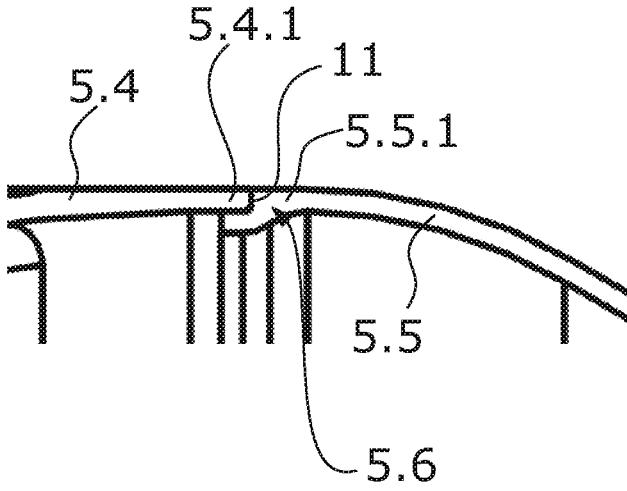
FIG. 3A shows a detail of FIG. 3.

The outer shroud (5) is formed by two portions, a spherical portion (5.4) and a remaining portion (5.5) extended from the spherical portion (5.4) to the first end (5.1) of the outer shroud (5). Each FIGS. 2 and 3 shows a different example of link between the spherical portion (5.4) and the remaining portion (5.5) of the outer shroud (5). According to FIG. 2, the spherical portion (5.4) and the remaining portion (5.5) are joined each other by welding (11). On the other hand and according to FIG. 3, the spherical portion (5.4) and the remaining portion (5.5) are also joined each other by welding (11), however, the outer shroud (5) comprises a step (5.6) extended from the remaining portion (5.5) and below the spherical portion (5.4) so that a joining end (5.4.1) of the spherical portion (5.4) rests. Specifically, the step (5.6) is provided from an end (5.5.1) of the remaining portion (5.5) where the remaining portion (5.5) is welded to the spherical portion (5.4). This particular configuration of the outer shroud (5) and the welding (11) is shown in detailed in FIG. 3A.

The ball joint (10) shown in FIGS. 1-3 further comprises a first ribbed pattern (8) on the 10 inner shroud (4) and a second ribbed pattern (9) on the outer shroud (5). In particular, the first ribbed pattern (8) is indentations arranged annularly on the inner surface (4.3) of the inner shroud (4). These indentations are understood as grooves located on the inner surface (4.3) of the inner shroud (4). On the other hand, the second ribbed pattern (9) is projections arranged annularly on the outer surface (5.3) of the outer shroud (5).

According to the example shown in FIGS. 1-3, both ribbed patterns (8, 9) has an isogrid configuration. Moreover, the first ribbed pattern (8) is arranged between the first thickening (6) and the second end (4.2) of the inner shroud (4), and particularly on the spherical portion (4.4) of the inner shroud (4). The second thickening (9) is arranged downstream of the second end (5.2) of the outer shroud (5), and particularly, on the spherical portion (5.4) of the outer shroud (5).

The ball joint (10) comprises a rest position where the ball joint (10) is not subjected to flexure stresses, that is, it is not rotated; and a plurality of operating positions where the ball joint (10) is subjected to flexure stresses, that is, it is rotated. The rotation of the ball joint (10) that allows the bellow (3) to flex will be deemed to mean when the shrouds (4, 5) of the housing rotate relative to each other as result of the tubular portions (1, 2) of the duct assembly being pressurized. That is, the ball joint rotation refers to bellow flexion rotation and not bellow torsion rotation.

Figure 4A:
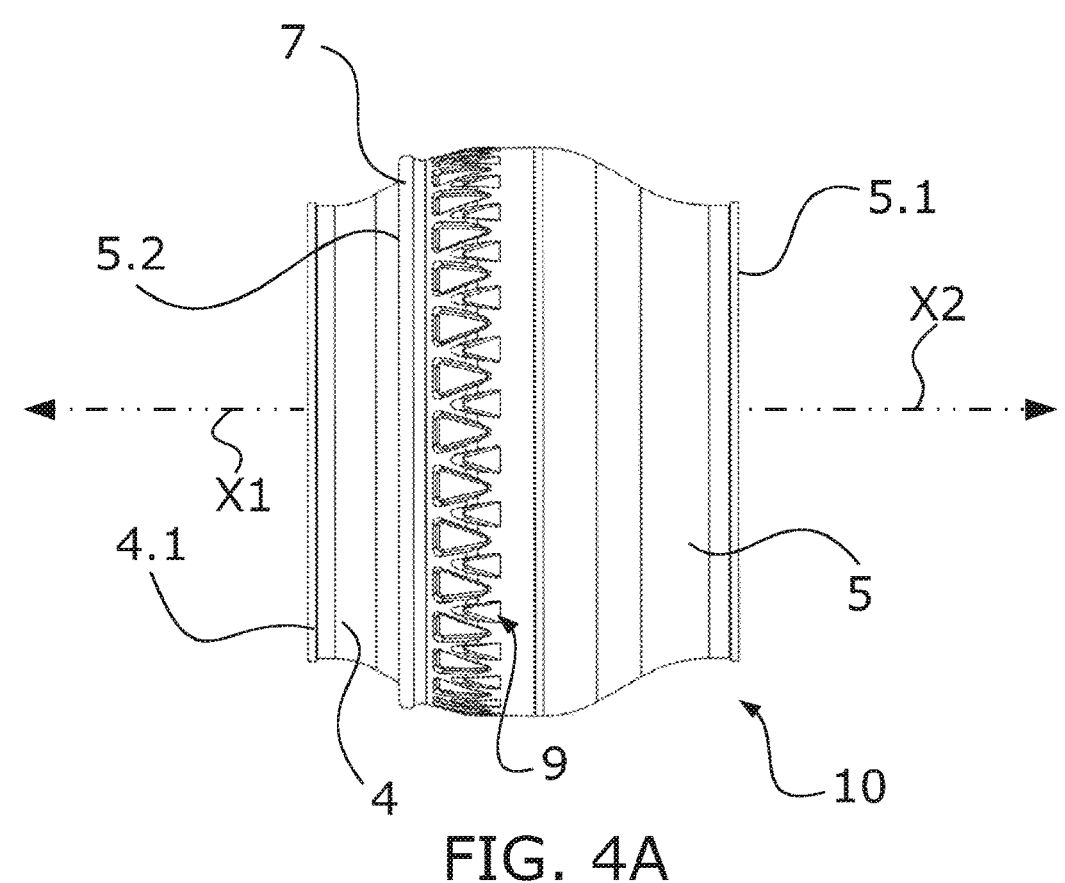
FIG. 4A shows a schematic frontal view of a ball joint in a rest position according to an embodiment of the present invention.

FIG. 4A shows a frontal view of the ball joint (10) (the same as shown in FIG. 1) in a rest position. In this rest position, the overlapping interface between the inner shroud (4) and the outer shroud (5) is annularly constant along the ball joint (10). Further, FIGS. 1-3 shown the ball joint (10) in the rest positions. In the rest position of the ball joint (10) according to an example, the first (8) and second (9) ribbed patterns are partially coincident along the ball joint due to the constant overlapping interface between the shroud (4, 5). FIG. 4A also shows the longitudinal axes (X1, X2) that the tubular portions (not shown) of the duct assembly will have. In this case where the ball joint (10) is in the rest position. Both longitudinal axes (X1, X2) are parallel to each other as it is understood that the ducts have not displaced relative to each other and therefore the ball joint (10) has not been subjected to rotation.

Figure 4B:
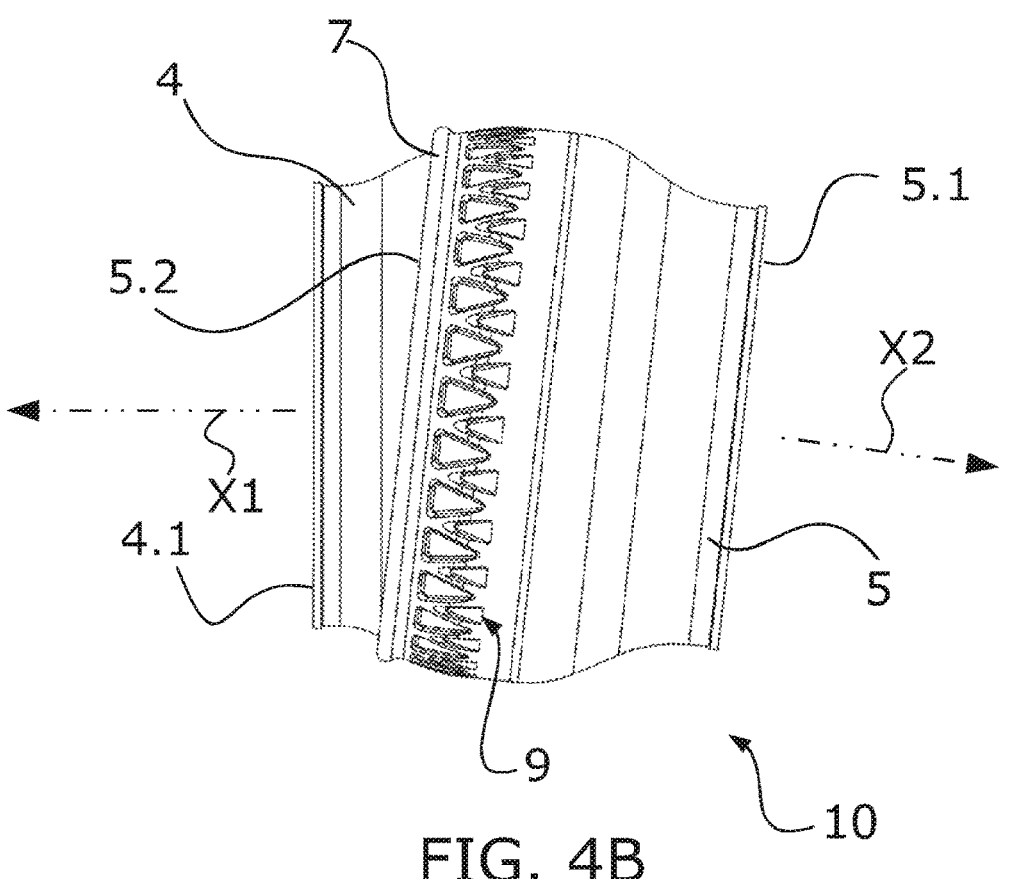
FIG. 4B shows a schematic frontal view of a ball joint in an operating position according to an embodiment of the present invention.

FIG. 4B shows a frontal view of the ball joint (10) (the same as shown in FIG. 1) in one operating position. In this operating position, the ball joint (10) is rotated with respect to its rest position so that the overlapping interface between the shrouds (4, 5) varies annularly along the ball joint (10) while the outer shroud (5) is still overlapping over the inner shroud (4). The rotation of the ball joint (10), also referred to the bellow flexion rotation, is further shown by the longitudinal axes (X1, X2) that the tubular portions (not shown) will have, in particular, due these longitudinal axes (X1, X2) are not parallel each other as shown in FIG. 4A of the rest position. That is, the rotation of the ball joint 1(10) shown in FIG. 4B corresponds to the rotation of the ball joint (10) around a first rotating axis (not shown) such that it leads to the bellow flexure and not to the bellow torsion. According to the view of FIG. 4B, the overlapping surface between the shrouds (4, 5) increases from the top to the bottom of the ball joint (10).

Figure 5:
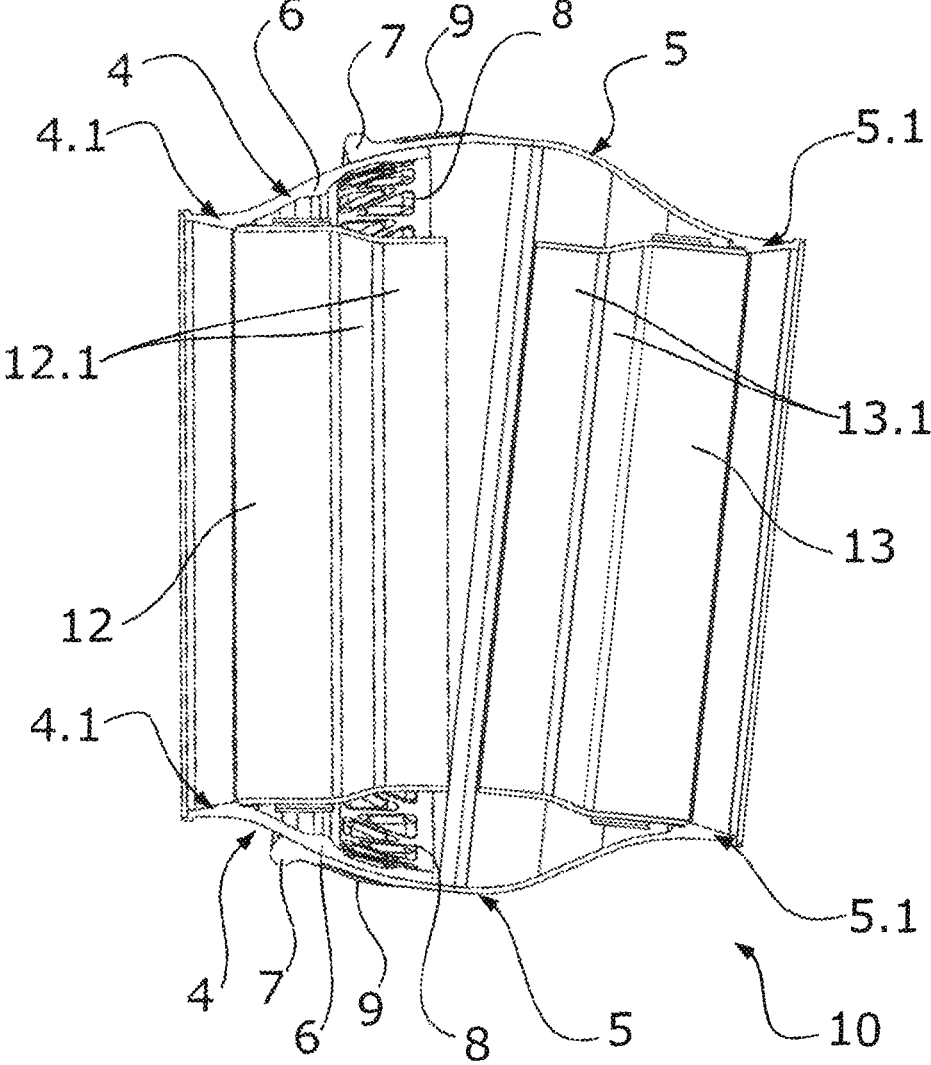
FIG. 5 shows a schematic cross sectional view of the ball joint shown in FIG. 4B.

FIG. 5 shows a cross sectional view of the ball joint (10) in the operating position of FIG. 4B without showing the bellow for a better view of the ball joint (10). The ball joint (10) shown in FIG. 5 corresponds to the ball joint (10) shown in FIGS. 1 and 2 but without shown the bellow (3).

According to this FIG. 5, the overlapping interface is larger in the bottom of the ball joint (10) than in the top. In particular, it can be seen how the contact surface between the inner shrouds (4) and the outer shroud (5) is larger in the bottom of the ball joint (10) compared with the top of the ball joint (10) according to the view of this FIG. 5.

, In addition, when the ball joint (10) is rotated as shown in FIG. 5, it can be seen how the position of the second thickening (7) in relation to the first thickening (6) varies annularly along the joint ball (10). In the top of the view of ball joint (10), the second thickening is located over the inner shroud (4) between the first thickening (6) and the second end (4.2) of the inner shroud (4). In the bottom of the view of the ball joint (10), the second thickening (7) is located over the inner shrouds (4) between the first end (4.1) of the inner shroud (4) and the first thickening (6).

By last, the inner (4) and outer (5) shrouds of the ball joint (10) described above in relation with FIGS. 1-5 are 3D printed structures, that is, they have been manufacture by additive manufacturing.

The invention claimed is:

1. A ball joint for a duct assembly of a gas turbine engine, the ball joint comprising:

a housing configured to connect a first and second tubular portions of the duct assembly, the first and second tubular portions having respective longitudinal axis;

a bellow arranged inside the housing and connected to the housing, the bellow being configured with limited flexure capability to accommodate variations in the angle between the longitudinal axes of the first and second tubular portions respectively;

the housing being further configured to hold the tubular portions against axial forces while allows the flexure of the bellow within predetermined angle limits, the housing comprising:

an inner shroud extending from a first end to a second end, the first end being configured to be in contact with the first tubular portion of the duct assembly and the second end being located over the bellow; and an outer shroud extending from a first end to a second end, the first end being configured to be in contact with the second tubular portion of the duct assembly and the second end being arranged above the inner shroud, so that the outer shroud partially overlaps above the inner shroud, forming an overlapping interface between the inner shroud and the outer shroud;

wherein the inner shroud comprises a first thickening at a region located between the first end and the second end and a spherical portion extending between the second end and the first thickening, further wherein the first thickening is configured as a projection in an inner surface of the inner shroud so that the projection protrudes towards the bellow;

the outer shroud comprises a spherical portion arising from the second end and a second thickening at the second end; further wherein the second thickening is configured as a projection in an outer surface of the outer shroud so that the projection protrudes towards outside the ball joint;

in a rest position where the ball joint is not subjected to flexure stresses, the overlapping interface between the inner shroud and the outer shroud is annularly constant along the ball joint; and in at least one operating position where the ball joint is subjected to flexure stresses, the overlapping interface between the inner shroud and the outer shroud varies annularly along the ball joint while the outer shroud still overlaps over the inner shroud;

where in the first and second thickenings are arranged such that, in the rest position of the ball joint, the first and second thickenings are axially aligned.

2. The ball joint according to claim 1, wherein the first thickening is a reinforcement ring extending annularly along the inner shroud, and the second thickening is a reinforcement ring extending annularly along the outer shroud at the second end.

3. The ball joint according to claim 1, further comprising a first and second liners that extend cantilevered from the first ends of the inner and outer shroud respectively, wherein the bellow is supported at the bellow ends on the first and second liners respectively.

4. The ball joint according to claim 3, wherein each liner comprises an extension partially covering the bellow so that the bellow being housed between the housing and the extensions of the liners.

5. The ball joint according to claim 1, wherein the bellow is directly attached to the housing so that the bellow being supported at ends of the bellow on the first ends of the inner and outer shroud respectively.

6. The ball joint according to claim 1, wherein:

the inner shroud comprises a first ribbed pattern arranged annularly at an inner surface of the inner shroud, the first ribbed pattern corresponding to indentations on the inner surface of the inner shroud; and the outer shroud comprises a second ribbed pattern arranged annularly at an outer surface of the outer shroud, the second ribbed pattern corresponding to projections on the outer surface of the outer shroud.

7. The ball joint according to claim 6, wherein the second ribbed pattern is arranged downstream of the second end of the outer shroud along a portion of the outer surface; and the first ribbed pattern is arranged between the first thickening and the second end of the inner shroud.

8. The ball joint according to claim 7, wherein the first and second ribbed pattern have an isogrid configuration.

9. The ball joint according to claim 1, wherein both the inner shroud and the outer shroud are 3D printed structures.

10. The ball joint according to claim 1, wherein the outer shroud is formed by two portions, the spherical portion and a remaining portion and wherein these two portions are joined.

11. The ball joint according to claim 10, wherein the spherical portion and the remaining portion are joined by welding.

12. The ball joint according to claim 11, wherein the spherical portion and the remaining portion are joined by high energy beam welding, and wherein the remaining portion comprises at an end where the remaining portion is welded to the spherical portion a step on which a joining end of the spherical portion rests.

13. The ball joint according to claim 12, wherein the two portions of the outer shroud are joined by laser welding.

14. A duct assembly of a gas turbine engine comprising a first duct with a first tubular portion, a second duct with a second tubular portion and at least one ball joint according to claim 1, wherein the first tubular portion of the first duct is connected to the first end of the inner shroud of the at least one ball joint and the second tubular portion of the second duct is connected to the first end of the outer shroud of the at least one ball joint.

* * * * *